(12) United States Patent
Kangastupa

(10) Patent No.: US 11,022,747 B2
(45) Date of Patent: Jun. 1, 2021

(54) LASER PROCESSING APPARATUS AND METHOD

(71) Applicant: Corelase Oy, Tampere (FI)

(72) Inventor: Jarno Kangastupa, Tampere (FI)

(73) Assignee: Corelase Oy, Tampere (FI)

( * ) Notice: Subject to any disclaimer, the term of this patent is extended or adjusted under 35 U.S.C. 154(b) by 0 days.

(21) Appl. No.: 16/464,310

(22) PCT Filed: Dec. 8, 2016

(86) PCT No.: PCT/FI2016/050855
§ 371 (c)(1),
(2) Date: May 28, 2019

(87) PCT Pub. No.: WO2018/104575
PCT Pub. Date: Jun. 14, 2018

(65) Prior Publication Data
US 2019/0383998 A1    Dec. 19, 2019

(51) Int. Cl.
*G02B 6/02* (2006.01)
*G02B 6/036* (2006.01)
(Continued)

(52) U.S. Cl.
CPC ...... *G02B 6/02042* (2013.01); *B23K 26/0604* (2013.01); *B23K 26/0608* (2013.01);
(Continued)

(58) Field of Classification Search
None
See application file for complete search history.

(56) References Cited

U.S. PATENT DOCUMENTS

| 5,012,069 A | 4/1991 | Arai |
| 5,449,881 A | 9/1995 | Nakata et al. |

(Continued)

FOREIGN PATENT DOCUMENTS

| CN | 101077549 A | 11/2007 |
| CN | 103097931 A | 5/2013 |

(Continued)

OTHER PUBLICATIONS

International Preliminary Report on Patentability received for PCT Patent Application No. PCT/FI2016/050855, dated Jun. 20, 2019, 12 pages.

(Continued)

*Primary Examiner* — Michelle R Connelly
(74) *Attorney, Agent, or Firm* — Morrison & Foerster LLP

(57) ABSTRACT

The invention concerns an apparatus and its use for laser processing. The invention also concerns a method and an optical component. According to the invention, at a first laser device, providing a first optical feed fiber and a second laser device providing a second optical feed fiber is provided. A beam combining means connected to the first and second feed fibers and to a multi-core optical fiber is adapted to form a composite laser beam by having the first optical feed fiber aligned with a first core of the multi-core optical fiber and the second optical feed fiber aligned with at least one second core of the multi-core optical fiber. The first and second cores outputs a composite laser beam to a workpiece to be processed. A control unit controls power density of at least one of first and second laser beams of the composite laser beam in at least one of: in response to approaching a change point in direction of cutting progression and to cause change in relation between the power density of the first output laser beam and power density of the second output (Continued)

laser beam in accordance with thickness of the workpiece being cut.

21 Claims, 4 Drawing Sheets

(51) Int. Cl.
 B23K 26/06 (2014.01)
 B23K 26/073 (2006.01)
 B23K 26/38 (2014.01)
 G02B 6/28 (2006.01)
 G02B 6/26 (2006.01)
 G02B 6/42 (2006.01)

(52) U.S. Cl.
 CPC ............ *B23K 26/073* (2013.01); *B23K 26/38* (2013.01); *G02B 6/02338* (2013.01); *G02B 6/036* (2013.01); *G02B 6/03611* (2013.01); *G02B 6/03666* (2013.01); *G02B 6/262* (2013.01); *G02B 6/2856* (2013.01); *G02B 6/4296* (2013.01)

(56) References Cited

U.S. PATENT DOCUMENTS

| | | | |
|---|---|---|---|
| 5,684,642 A | | 11/1997 | Zumoto et al. |
| 8,399,803 B2* | | 3/2013 | Idaka ................. B23K 26/03 |
| | | | 219/121.83 |
| 9,620,925 B2 | | 4/2017 | Keen et al. |
| 10,310,201 B2* | | 6/2019 | Kliner ................. G02B 6/4296 |
| 10,807,190 B2* | | 10/2020 | Salokatve .......... B23K 26/0096 |
| 2002/0198622 A1* | | 12/2002 | Dinauer ................. G05B 19/19 |
| | | | 700/166 |
| 2006/0219673 A1* | | 10/2006 | Varnham ............ B23K 26/0734 |
| | | | 219/121.6 |
| 2007/0170157 A1 | | 7/2007 | Miyajima et al. |
| 2009/0211700 A1 | | 8/2009 | Terada et al. |
| 2011/0127697 A1* | | 6/2011 | Milne ................. B23K 26/046 |
| | | | 264/400 |
| 2011/0240617 A1* | | 10/2011 | Xu ......................... B23K 26/00 |
| | | | 219/121.72 |
| 2013/0073071 A1 | | 3/2013 | Culp |
| 2013/0148925 A1 | | 6/2013 | Muendel et al. |
| 2013/0223792 A1* | | 8/2013 | Huber .................. B23K 26/064 |
| | | | 385/18 |
| 2014/0010508 A1 | | 1/2014 | Matsuo et al. |
| 2015/0372444 A1* | | 12/2015 | Keen .................... G02B 6/2551 |
| | | | 385/95 |
| 2018/0147661 A1* | | 5/2018 | Salokatve ............ G02B 6/2821 |
| 2019/0118299 A1* | | 4/2019 | Kangastupa ....... B23K 26/0734 |

FOREIGN PATENT DOCUMENTS

| | | | |
|---|---|---|---|
| CN | 103842124 A | | 6/2014 |
| CN | 103842305 A | | 6/2014 |
| EP | 1813379 A1 | | 8/2007 |
| JP | 58-159514 A | | 9/1983 |
| JP | 3-238184 A | | 10/1991 |
| JP | 2000-351087 A | | 12/2000 |
| JP | 2004-105972 A | | 4/2004 |
| JP | 2007-518566 A | | 7/2007 |
| JP | 2007-196254 A | | 8/2007 |
| JP | 2013180295 A | * | 9/2013 |
| JP | 2013235139 A | | 11/2013 |
| JP | 5460917 B1 | | 1/2014 |
| JP | 2014013354 A | | 1/2014 |
| JP | 2014016472 A | | 1/2014 |
| JP | 2014-18800 A | | 2/2014 |

OTHER PUBLICATIONS

International Search Report and written Opinion received for PCT Patent Application No. PCT/FI2016/050855, dated Mar. 30, 2017, 18 pages.
Office Action received for Chinese Patent Application No. 201680091463.0, dated Sep. 26, 2020, 16 pages (12 pages of English Translation and 4 pages of Official Copy).
Extended European Search Report received for European Patent Application No. 16923523.1, dated Aug. 7, 2020, 6 pages.
Office Action received for Japanese Patent Application No. 2019-530826, dated Aug. 11, 2020, 16 pages (9 pages of English Translation and 7 pages of Official Copy).
Office Action received for Japanese Patent Application No. 2019-530826, dated Feb. 2, 2021, 13 pages (8 pages of English Translation and 5 pages of Official Copy).

* cited by examiner

LASER PROCESSING APPARATUS AND METHOD

FIELD OF THE INVENTION

The invention relates to a laser processing apparatus and method. In particular, the invention concerns cutting of materials by laser processing.

BACKGROUND OF THE INVENTION

When processing metal with a laser beam, the laser beam is typically condensed through a condenser lens into a spot of 100-500 µm to increase energy density and instantaneously heat the workpiece to a metal melting point so that the workpiece melts. At the same time, an assist gas may be fed to prevent corrosion of the molten metal. A laser beam of a one-micrometer waveband from a solid-state laser or fiber laser realizes a very high optical energy intensity and absorbance on a metallic work compared with a laser beam in the ten-micrometer waveband from a $CO_2$ laser. However, if a one-micrometer waveband laser beam with a Gaussian beam is used with an oxygen assist gas to cut a mild steel sheet workpiece, the melt width on the top face of the workpiece widens unnecessarily and impairs kerf control. In addition self-burning may occur to deteriorate the quality of the laser cutting.

Use of ring-shaped laser beams, which provide an intensity profile that can be described as having an annular or "doughnut"-like shape is known for laser processing. It has been observed that cutting of a metal of a given thickness can be performed at much lower power when using a doughnut beam instead of more conventional beam profiles, and may yield good results in terms of cutting speed and quality.

U.S. Pat. No. 8,781,269 discloses various arrangements to direct laser beams to a multi-clad fiber to generate different beam profile characteristics of an output laser beam, where an input laser beam is electively coupled into an inner fiber core or into an outer ring core.

Such materials processing applications strive to maximize the brightness of the laser beam. Brightness is defined as the power per unit solid angle and unit area. As an example of the importance of brightness, increasing the brightness of a laser beam means that the laser beam can be used to increase the processing speed or the material thickness. High brightness laser beams can be obtained from e.g. fiber lasers and thin disc lasers. Direct diode lasers have constantly also improved in brightness, but commercial direct diode lasers for materials processing do not quite yet reach the brightness of fiber or thin-disc lasers.

Laser processing performed according to prior art have some important drawbacks. In cutting applications, especially of thick materials, the laser beam needs to have a high intensity and a relatively broad focal spot, in order for vaporize and otherwise remove the molten metal, to avoid it from welding the pieces together again after the laser beam. Such high-power cutting leaves the cut surfaces somewhat irregular in shape. There is a need for improved methods and devices for laser cutting.

SUMMARY OF THE INVENTION

The invention is defined by the features of the independent claims. Some specific embodiments are defined in the dependent claims.

According to one aspect of the invention a laser processing apparatus comprises:
at least one first laser device, each providing at least one first optical feed fiber with a first laser beam;
at least one second laser device, each providing at least one second optical feed fiber with a second laser beam;
beam combining means connected to said first and second feed fibers and to a multi-core optical fiber, the combining means being adapted to form a composite laser beam by having said at least one first optical feed fiber aligned with a first core of said multi-core optical fiber, and said at least one second optical feed fiber aligned with at least one second core of said multi-core optical fiber, wherein said first core of said multi-core optical fiber has a circular cross-section, and said second core has an annular shape concentric to said first core;
said first and second cores being connectable to a laser processing head, to direct a composite laser beam comprising first and second output laser beams to a workpiece to be cut; and
a control unit functionally connected to said first and second laser devices, to individually control the power density in said first and second output laser beams, wherein the control unit is configured to adapt the power density of at least one of the first and second output laser beams in at least one of: in response to approaching a change point in direction of cutting progression and to cause change in relation between the power density of said first output laser beam and power density of said second output laser beam in accordance with thickness of the workpiece being cut.

According to a second aspect of the invention, a method for cutting a workpiece with a laser beam comprises the steps of:
providing at least one first laser beam from at least one first optical feed fiber connected to at least one first laser device;
providing at least one second laser beam from at least one second optical feed fiber connected to at least one second laser device;
combining said first and second laser beams in a multi-core optical fiber by aligning said at least one first optical feed fiber with a first core of said multi-core optical fiber and said at least one second optical feed fiber with a second core of said multi-core optical fiber; wherein said first core of said multi-core optical fiber has a circular cross-section, and said second core has an annular shape concentric to said first core,
directing a composite laser beam comprising first and second output beams from said multi-core optical fiber to a workpiece to be cut; and
controlling, by a control unit, the power density individually in said first and second output laser beams, wherein the power density of at least one of the first and second laser beams is adapted in at least one of: in response to approaching a change point in direction of cutting progression and to cause change in relation between the power density of said first output laser beam and power density of said second output laser beam in accordance with thickness of the workpiece being cut.

According to some embodiments, the workpiece is processed according to a predetermined processing profile including at least one change of cutting operation progression direction, and the power density of at least one of said first and second output laser beams is adapted based on the current cutting position in relation to the processing profile.

According to some embodiments, the power density is reduced gradually when approaching the change point.

According to some embodiments, said second laser beam is switched off in response to the thickness of the workpiece falling under predetermined thickness limit value for switching off annular laser beam.

Next, embodiments of the invention are described in more detail with reference to the attached drawings.

BRIEF DESCRIPTION OF THE DRAWINGS

In the following, the invention is described in detail with reference to the attached drawings, wherein.

DETAILED DESCRIPTION OF EMBODIMENTS

There are now provided a method and apparatus enabling to improve cutting quality for certain laser-cutting challenges, namely how to optimize for varying material thicknesses and discrepancies during cutting operation. This is achieved by arranging the cutting operations by multiple laser beams by adaptive power control for each laser beam enabling optimal beam profile combination for specific situations. These features may be applied in a method and apparatus wherein a first laser output beam having a substantially a circular cross-section and a second laser output beam with a substantially annular shape concentric to the first laser output beam are formed. The laser beams may be formed by separate laser devices, such as diode and fiber lasers. The first output laser beam may thus be referred to as circular or center beam, and the second output laser beam as annular or ring beam. The first output laser beam and the second laser output beam are selectively directed to a workpiece with overlapping elements to be cut.

There is provided a laser cutting apparatus enabling a control unit thereof to individually control power densities in the center beam and/or the ring beam, regardless of the state of the other beam. In particular, specific power density control is arranged causing a beam profile combination optimal for an a discrepancy point in the cutting process and/or material being cut. The power density of the center beam and/or the ring beam is adapted in at least one of: in response to approaching a change point in direction of cutting progression and to cause change in relation between the power density of the center beam and power density of the ring beam in accordance with thickness of the workpiece being cut. The power densities of the resulting output beams may be adapted by adapting respective laser power level, modulation parameters in the laser device, pulse width and/or frequency of light pulses from the laser device, and/or other parameters that affect the power density applied to the workpiece by respective laser output beam.

Figure 1A:
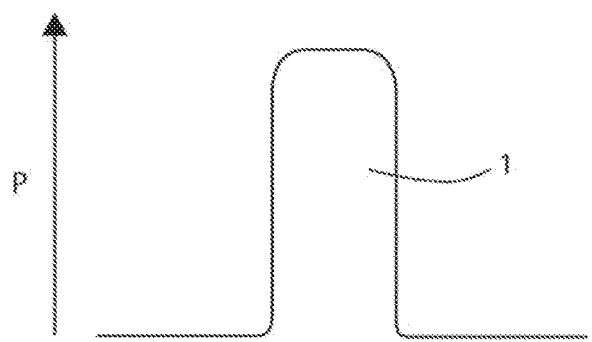
FIG. 1A to 1D illustrate schematic cross-sections of center and ring laser beam profile examples.
Figure 1B:
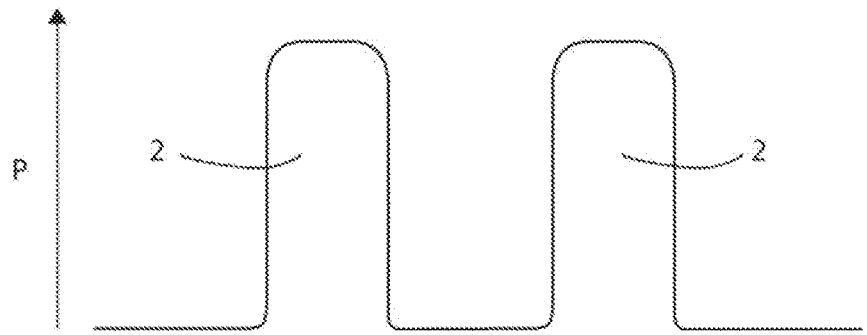
Figure 1C:
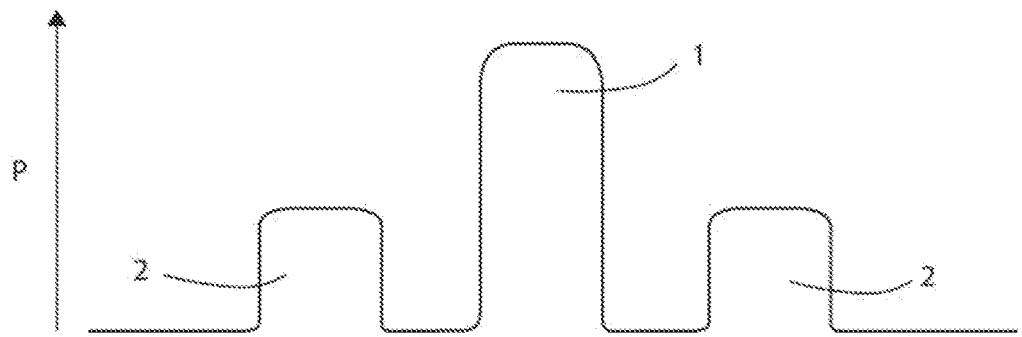
Figure 1D:
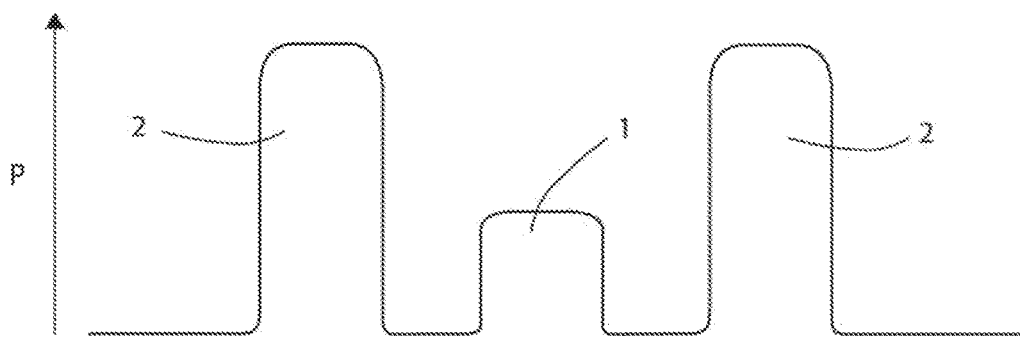

FIGS. 1A to 1D illustrate some basic examples of different beam profile combinations that may be controlled during the cutting operation. Power P is applied in FIG. 1A only for the center beam 1 and in 1B only for the ring beam 2. FIG. 1C illustrates a dual-beam profile with higher power at the center beam 1, whereas in FIG. 1D the ring beam 2 has higher power density and power level.

Figure 2:
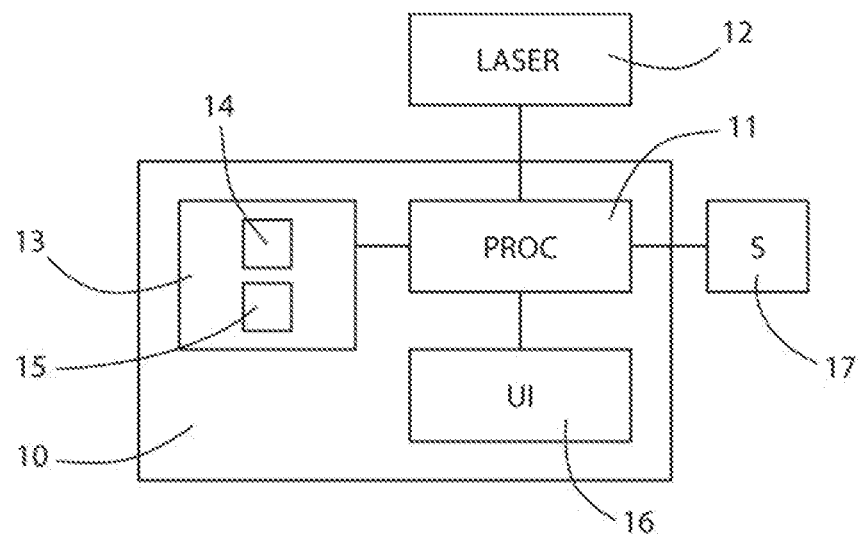
FIG. 2 illustrates a control unit for laser beam profile power control according to some embodiments of the present invention.

FIG. 2 illustrates a control unit 10 according to some embodiments for adaptive power control for center 1 and ring beams 2 of a laser apparatus. The control unit is connected directly or indirectly to at least one laser unit 12. The control unit 10 may comprise a general-purpose computer provided with appropriate software for power control or the control unit may comprise a microcontroller. The control unit comprises at least one processor 11, which may be a single- or multi-core processor, wherein a single-core processor comprises one processing core and a multi-core processor comprises more than one processing core. The processor may comprise at least one application-specific integrated circuit, ASIC. The processor may be means for performing method steps in the device. The processor may be configured, at least in part by computer instructions, to perform presently illustrated beam profile power control features.

The control unit device may comprise memory 13. The memory may comprise random-access memory and/or permanent memory. The memory may comprise at least one RAM chip. The memory may comprise solid-state, magnetic, optical and/or holographic memory, for example. The memory may be at least in part accessible to the processor. The memory may comprise computer instructions 14 that the processor 11 is configured to execute. When computer instructions configured to cause the processor to perform certain actions are stored in the memory, and the device in overall is configured to run under the direction of the processor using computer instructions from the memory, the processor and/or its at least one processing core may be considered to be configured to perform said certain actions. The memory 13 may be at least in part comprised in the processor. The memory 13 may be at least in part external to the device but accessible to the control unit device.

The presently illustrated power control features may be caused by at least one computer program stored in the memory 13 and comprising instructions 14, when executed in the processor 11, to cause the processor to adaptively control the power densities of the laser beams by respective output control signals to the laser unit(s) 12. The memory 13 may also store various parameters 15 affecting power control by the processor, such as parameter sets defining different center and/or ring beam profiles and different cutting profiles and programs adjustable by an operator.

The control unit device may comprise user interface, UI 16. The UI may comprise at least one of a display, a keyboard, a touchscreen, for example. The control unit may be arranged to control the power densities at least partly on the basis of user input, for example adapt the power density relation on the basis of user input regarding the workpiece. The control unit 10 may be connected also to one or more sensors 17, such as a sensor monitoring progress of the laser cutting operation and/or a sensor detecting properties of the workpiece being processed. The control unit 10 may comprise also other units, such as a transmitter and a receiver configured to transmit and receive information in accordance with at least one cellular or non-cellular standard.

According to a first aspect, the relation between the power density of said first output laser beam, or the center beam 1, and power density of said second output laser beam, or the ring beam 2, in accordance with thickness of the workpiece being cut.

According to some embodiments, when a first workpiece is thinner than a second workpiece, higher proportion of the power density of the center beam 1 to that of the ring beam 2 is controlled for the first workpiece than for the second workpiece. In other words, relatively more power is controlled to the center beam 1 for cutting a thinner material, whereas the ring beam 2 is controlled relatively more power for a thicker material.

There are various advantages achievable by applying the presently disclosed features and applying optimal power densities and relation between for center and ring beams for varying workpiece thicknesses. On advantage is that cutting quality can be improved. Due to differences in shapes and beam cross-section areas, the center beam 1 provided by the inner core of the multi-core optical fiber can produce a better beam quality than the ring beam 2 and can thus be controlled to provide very good quality cutting surface area for cutting thin materials and workpieces, or making piercing in cutting of thick materials. For thicker materials, the disadvantages of a somewhat lower beam quality produced by the ring beam can be outweighed by the combined processing speed and cleanliness of the cutting surfaces due to the ring-like intensity distribution of the outer core. The power intensities of the inner and outer cores may be adjustable by the control unit 10 individually, and according to the current thickness of the workpiece and possible a set of other parameters associated with the cutting operation, by adjusting the power of the originating laser sources.

The power density of the ring beam 2 may thus be controlled to increase more than the power density of the center beam 1 in response to an increase in the thickness of the workpiece. The use of the ring beam 2 enables to have good absorption in edge areas of a thicker material being cut, facilitating good cutting edge quality.

The control unit 10 may be configured to cause piercing of the workpiece by specific power densities and relation between the center and ring beams, depending on the thickness of the workpiece. In some embodiments, both the center beam 1 and the ring beam 2 are controlled to cause the piercing. After the piercing, the control unit may control an optimal power density and relation between the center and ring beams for cutting operation.

The control unit 10 may be configured to switch off the ring beam in response to the thickness of the workpiece falling under predetermined thickness limit value for switching off the ring laser beam. In some embodiments, the limit value is selected from the range of 4 to 8 millimeters, in one embodiment 6 mm.

Different power densities and relation between the center beam 1 and the ring beam 2 may be controlled depending on the material being cut. Above-illustrated embodiments for controlling the relation between the power densities of the center beam 1 and the ring beam 2 have been tested with good results. For example, for copper it has been detected that excellent cutting quality can be achieved by the presently disclosed arrangement by controlling ~3:1 relation between the ring beam power density and the center beam power density, when the workpiece is 10 mm or more.

There are also other cutting parameters, such as cutting speed and diameters of the center and ring beams, that may affect the control of the power densities and the power density relation of the center beam 1 and the ring beam 2 for different workpiece thicknesses. Such other parameters may be controlled together with and in relation to the presently disclosed power control parameters.

Figure 3:
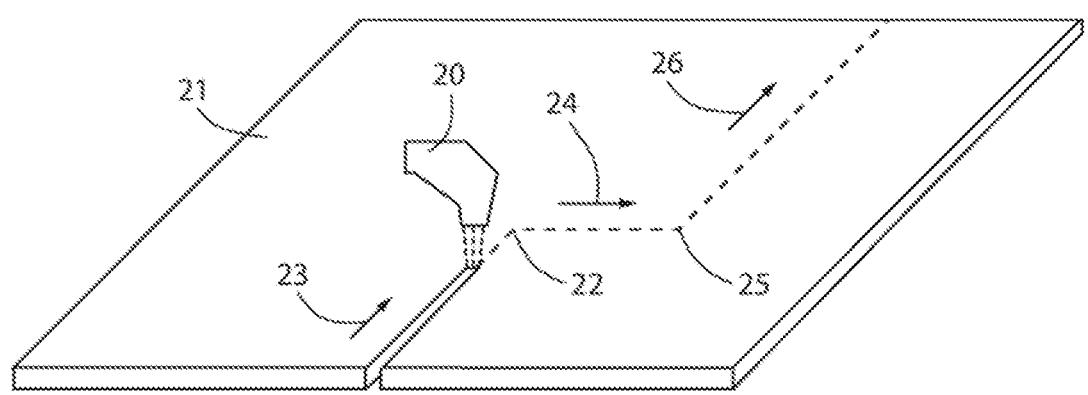
FIG. 3 illustrates an example of laser cutting operation involving turning points.

FIG. 3 illustrates a cutting operation involving changes 22, 25 in cutting operation direction 23, 24, 26. The workpiece 21 is being cut according to a predetermined processing profile including changes of the cutting operation progression direction 23, 24, 26, referring generally to change of direction of advancement of processing/cutting action in the workpiece.

According to a second aspect, the control unit 10 is configured to adapt the power density of the center beam 1 and/or the ring beam 2 in response to approaching the change point 22, 25 of the processing direction 23, 24, 26, that may also be referred to as the turning point. The power density in the center beam 1 and/or the ring beam 2 may be controlled to reduce in connection with the movement of the laser head relative to the workpiece slowing down. Similarly, after the turning point 22, 25, when the laser head 20 is returning to the cutting progress as before approaching the turning point, the power densities are reinstated.

The control unit 10 may decrease the power density of the ring beam 1 and/or center beam 2 for predetermined period in response to approaching a change point. In some other embodiments, the power control is based on the current cutting position in relation to the processing profile, i.e. at which position the laser head 20 is cutting the workpiece in relation to the processing profile, and/or the current speed of the laser head relative to the workpiece. This enables to maintain high-quality cutting surfaces also in turning points where the laser head may slow down or stop temporarily.

In some embodiments, the power density of the ring beam 2 may be reduced in response to approaching the turning point 22, 25. In some embodiments, the control unit 10 may switch off the center beam 1 at the turning point, and switch on the center beam 1 after the change point.

The control unit 10 may reduce the power density(-ies) gradually when approaching the turning point 22, 25. Similarly, the power density(-ies) may be reinstated gradually after the turning point. The power density may be decreased or increased linearly with the decrease or increase of the speed of the processing head 20.

In some embodiments, the control unit 10 is arranged to, in addition to or instead of the power density control, cause also other control operation affecting the composite laser beam 1, 2 around the discrepancy point in the cutting operation. In an embodiment, the control unit 10 is configured to control modulation of the center beam 1 and/or the ring beam 2 when approaching the change point 22 and/or in response to the change of the workpiece width. For example, the control unit 10 may switch on modulation when approaching the change point. The state or parameters regarding the modulation before the turning point may be controlled when direct cutting is continued after the turning point.

The present power control features in connection with processing direction change enable to compensate for the quality-deteriorating effects of the laser head slowing down before the turning point and then accelerating again.

At least some of the presently disclosed embodiments may be applied for piercing and continuous cutting applications. In case of continuous cutting, the leading edge of the ring beam 2 in the direction of movement of a laser processing head causes a first intensity peak and the rear edge of the ring beam causes a second intensity peak. Hence, the elements are heated in stages and the intensity level of the rear and leading edge may be lower as compared to single center or spot beam to cause adequate action. In addition to pre-heating, the leading edge may also enable contaminant ablation. This enables to avoid sharp temperature change and avoid or at least reduce subsequent tempering and thus weaker areas caused by the sharp temperature change. The use of the ring beam in continuous cutting is also advantageous in avoiding spatter.

A hybrid of center beam 1 and ring beam 2 may be generated by combining laser beams from originating laser devices and feed fibers in a multi-core optical fiber, from which a resulting composite laser beam with the center beam 1 and ring beam 2 may be directed to the workpiece. A first optical feed fiber may be aligned with a first core of the multi-core optical fiber and a second optical feed fiber may be aligned with a second core of said multi-core optical fiber. The first core of said multi-core optical fiber has a circular cross-section and the second core has an annular shape concentric to said first core. Some further example embodiments are illustrated below.

In some embodiments, keyhole laser cutting is applied in combination with heat conduction cutting to provide dynamically adaptable center and ring laser beam profiles. Heat conduction cutting is applicable for cutting metal sheets typically up to a material thickness of approximately 2 mm. A metal sheet which is processed by a diode laser capable of conduction cutting, impacts a relatively shallow but wide spot of the metal. Typically diode lasers of this kind have a power rating of 2 kW and a power density of well under 0.1 MW/cm$^2$. A typical keyhole pattern caused by a high brightness laser, such as a fiber laser. There is no practical limit to how thick metal sheets can be cut with such a laser, but it depends of course on the laser beam intensity and the processing speed, i.e. the speed with which the laser beam is moved across the metal surface. Fiber lasers may have a power rating of up to 1-10 kW or more, and a power intensity of several MW/cm$^2$. The diameter of the keyhole may be in the region of less than a millimeter, 0.1 millimeter for example, and the diameter of the spot may be in the region of several millimeters, such as 3 millimeters, for example. When comparing pure keyhole cutting and application of hybrid cutting by circular and annular laser beams it has been noted that the hybrid cutting penetration is at least 20% deeper than that of pure keyhole cutting using the same processing speed.

Figure 4:
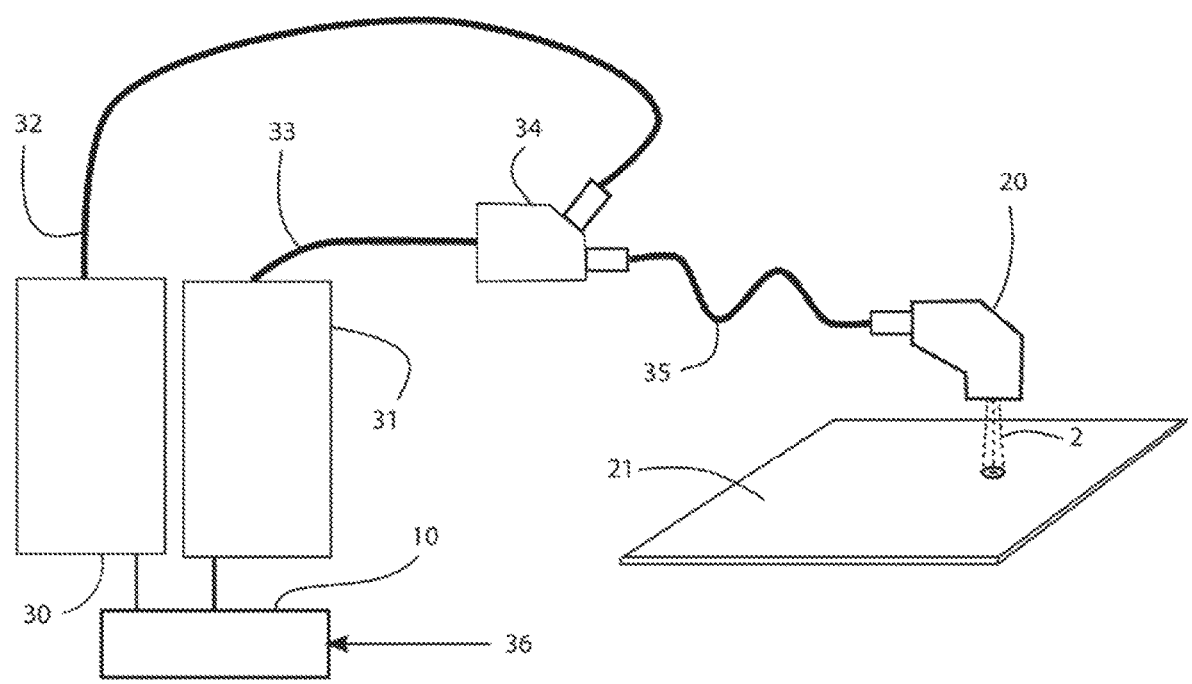
FIG. 4 shows an example of an apparatus according to some embodiments of the present invention.

FIG. 4 shows one embodiment of an apparatus enabling independent center and ring beam power control and in which at least some of the above illustrated power control features may be applied. A high brightness fiber laser 30 is connected with an optical fiber 32 to a laser beam combiner 34. Likewise, one or several solid state or diode lasers 31 are connected with a fiber 33 to the beam combiner 34. Generally, single laser beam combiners are known in the art. In this case the task of the combiner is to arrange all incoming laser beams so that they can be coupled to a dual core optical fiber 35. Thus, the hybrid nature of the laser is the result of having two laser beams propagating inside a single dual-core optical fiber 35. The two laser beams inside the fiber 35 have typically different brightness and intensity profiles, and may even have different wavelengths. Furthermore, the power levels in the two laser beams may be independently and continuously controlled by adjusting the power levels from the fiber laser 30 and solid state or diode laser 31.

In order to achieve a sufficient brightness of the beam, the high-brightness fiber laser 30 may consist of diode-pumped single or multiple fiber laser oscillator or master oscillator-power amplifier (MOPA) modules, each consisting of fiber-coupled diode lasers coupled to a fiber resonator, for example. Further examples of high-brightness lasers are fiber-coupled thin-disc lasers or Nd-YAG lasers, which are pumped with light from diode lasers. Modern laser technology frequently relies on light as energy transfer medium, as many active solid-state light amplification materials are insulators. Diode lasers have replaced previously used flash lamps because of their higher efficiency and narrower light spectrum.

The laser 31 is typically a fiber-coupled laser that may also comprise a solid-state laser resonator pumped by diode lasers, e.g. a thin-disc laser resonator (not shown). The dual core optical fiber 35 may be arranged to carry the laser beam from the fiber laser 30 in its center core and the beam generated by one or multiple second laser resonators 31 in an outer core which is arranged annularly around the center core, at a distance from the center core, see FIG. 6A. Obviously, and in one embodiment of the invention, both first and second lasers may be fiber lasers, each having independently controllable power levels. Some lasers are fiber lasers by construction and inherently feed the light into an optical fiber, others need to be optically interfaced with a fiber in order to align the laser beam to the core of the output fiber. Thus, in some embodiments, both lasers 30 and 31 may be fiber lasers, in other embodiments any combination of fiber and solid-state or diode lasers, or both may be diode lasers. The purpose of the laser apparatus and the power ratings of the individual laser modules determine which kinds of lasers are feasible to be connected to the beam combiner 34.

The dual core optical fiber is at its opposite end connected to a laser processing head 20 which guides a combined or composite laser beam 1, 2 onwards to a workpiece 21. The laser processing head 20 usually comprises collimating and focusing lenses (not shown) to produce an image of the intensity profile emerging from the end of the fiber 35 onto the workpiece 21 with a desired size, as determined by the focal lengths of the lenses. The task of the laser head 20 may also be to provide a pressurized gas jet to a cutting line. Pressurized gas also protects the optics within the laser head 20 from spitting molten metal, and also removes it from the cutting line helping to keep it clean. In one embodiment, oxygen assist gas is applied at least in connection with cutting progression turning points, providing additional energy and enabling to further improve the cutting edge quality in these points.

In one embodiment of the invention, the apparatus is provided with a control unit 10. The control unit may also be integrated in one of the laser units 30 or 31. Alternatively, all units 30, 31 and 10 may be placed in a single housing and be integrated with each other in their construction, for convenience and reliability. As indicated, the control unit 10 may be used to perform independent power control of the ring 2 and central 1 beams profile, and to enable dynamically adjustable ring-center beam which can be adjusted on-the-fly by applying at least some of the above-illustrated features. The control unit may be configured to control modulation of at least one of the laser units 30, 31. Preferably the modulation of the both laser beams can be dynamically controlled separately. Hence, a large variety of different cutting applications and purposes becomes possible by the same apparatus. The beam profile may be dynamically adjusted to fit variety of demands of challenging cutting types/applications, such as different materials, coatings and/or thicknesses.

The control unit 10 may be arranged to receive feedback 36 from the user of the laser head 20, or automatic feedback e.g. from light intensity sensors. The feedback or input is then used to control the power of the lasers 30 and 31 to follow predetermined targets, or to adjust the laser power according to the resulting cutting result observed at the workpiece 21. The control unit 10, or another control unit may also control other functions of the apparatus, such as the movement of the laser processing head 20 in relation to the workpiece.

According to present invention, the beam combiner 34 is made of fused silica components where optical power is propagating inside fused silica through the entire combiner structure, and the combiner has optical fibers at the input and output. Therefore, in the present invention the beam combiner 34 can be called an all-glass fiber combiner.

Figure 5:
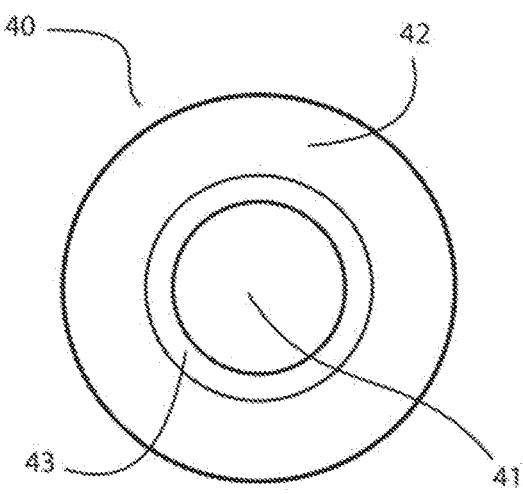
FIG. 5 shows in cross-section a composite laser beam according to some embodiments of the present invention.

In FIG. 5 is shown the structure of a composite laser beam 40 emerging from the laser processing head to the workpiece 21. An annular outer ring beam 42 is carrying the laser power provided by laser device 31. Correspondingly, an inner central beam 41 is carrying the laser power provided by fiber laser device 30, and will cause a keyhole pattern in the workpiece, due to its higher brightness. Between the beams is an annularly shaped zone 43, which provides only stray or no laser radiation at all.

Figure 6A:
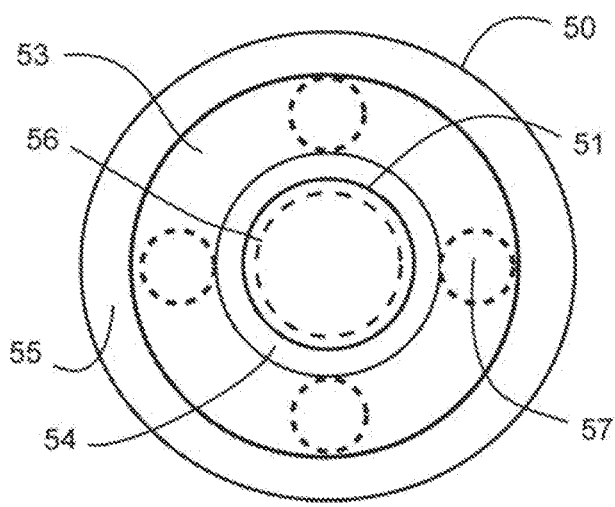
FIG. 6A shows a cross-section of a receiving end of coupling means according to some embodiments.

In FIG. 6A is shown a cross-section of an example dual core optical fiber 50, having a central core 51 with a primary cladding 54. The outer core 53 is spatially formed by the inner cladding 54 and the outer cladding 55. As is clear to anyone familiar with the art, the cladding is defined as a material having a lower refractive index than that of the core. For example, the diameter of the central core 51 may be 70 µm, and the inner and outer diameters of the outer core 53 may be 100 µm and 180 µm, respectively. The central and peripheral cores 51 and 53 may also take other forms than those described above. The central core 51 may be of a square or rectangular shape, for instance. The peripheral core 53 may also have rectangular boundaries or be composed of multiple segments of linear or circular shapes.

With dashed lines is shown how the cores of the ends of fused feed fibers 56 and 57 (fibers 72 and 71 in FIG. 7) from the beam combiner may align with the cross-section of the dual core optical fiber 50.

The laser radiation in the central core 51 of the dual core optical fiber 50 has a central and narrow spatial intensity profile, while the intensity distribution in the outer core 53 is taking the shape of a doughnut. This spatial intensity pattern is further imaged with processing optics in the laser head 20 onto the workpiece. With this configuration, the beam quality of the laser beam is relatively high both in the center and outer cores.

Figure 6B:
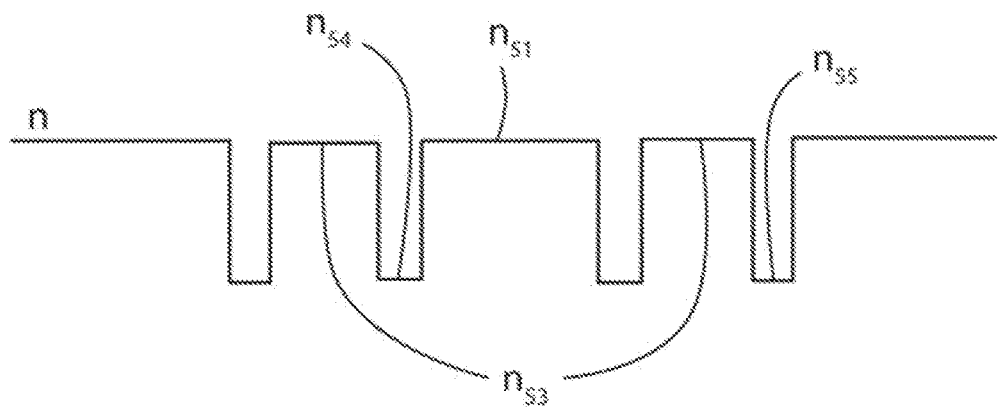
FIG. 6B illustrates the refractive index profile at the output of coupling means according to some embodiments of the present invention.

Referring now to FIG. 6B, an example refractive index profile of an optical dual core fiber 50 is shown. The cores 51 and 53 have a refractive index $n_{51}$ and $n_{53}$ that is higher than the indexes $n_{54}$ and $n_{55}$ of the encircling materials 54 and 55 respectively. In this way the laser beam is guided to a workpiece with the least possible degradation in the annular intensity profile and attenuation of the optical power and intensity in each of the cores, cf. FIG. 5.

The refractive index of fused silica can be adjusted by doping it with impurities. Doping fused silica with Germanium results in an increase of the refractive index, while doping it with Fluorine results in reduction of the refractive index. Therefore the cores 51 and 53 may be made of Ge-doped or un-doped fused silica, and their primary claddings 54 and 55 of F-doped fused silica, for example.

Figure 7:
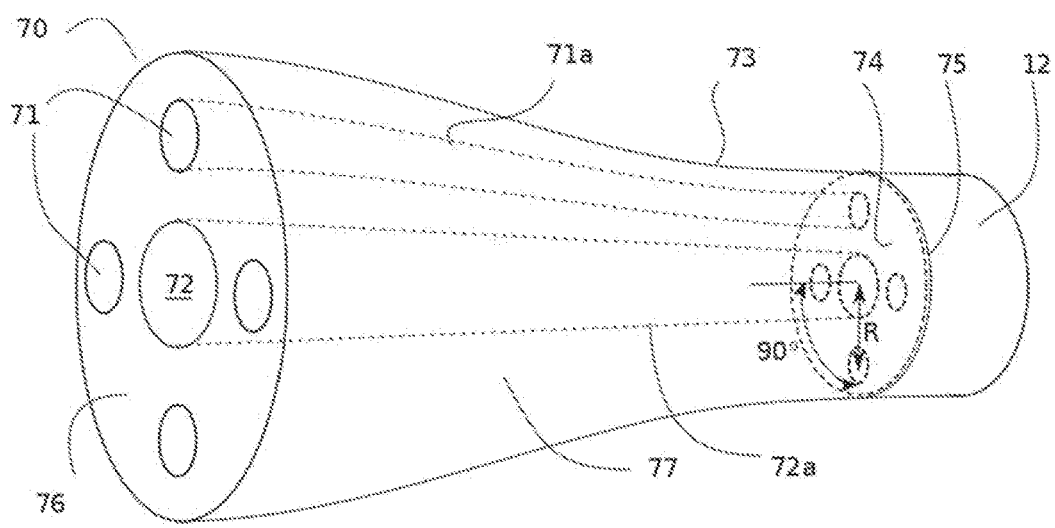
FIG. 7 shows schematically an optical component according to an embodiment of the present invention.

In FIG. 7 is shown the key optical component 70 of the fiber combiner 34. It is a multi-bore capillary tube having a body portion consisting of a fused silica glass tube 77, an input end 76 for receiving laser beams (not shown) carried by optical feed fibers 71 and 72 from at least two laser devices (e.g. fibers 32 and 33 from devices 30 and 31). It also has an opposite output end 74 for delivering a composite output laser beam consisting of at least two laser beams aligned with each other in the same direction.

The optical feed fibers 71, 72 entering at the input end 76 extend through said body portion in capillary bores to said output end 74, and are fused with the glass tube 77 to form a component consisting of light guiding cores 71a, 72a and encircling glass material. The cores have refractive index that is higher than the refractive index of the encircling glass material around the cores to provide for propagation of optical power in the cores through the entire component by means of total internal reflection.

To show the principle of the fiber combiner, the dimensions of the cores and the dimensions of the component 70 are not in scale, and for clarity, only a couple of the cores are shown with dashed lines.

An optical component 70 may be manufactured by e.g. drawing. In this example, there may be a larger bore for the fiber 72 of about 300 µm in diameter in the center and four smaller bores for fibers 71 placed symmetrical and peripheral to the center bore 72. The smaller bores may have a diameter of about 150 µm, for example. The outside diameter of the capillary tube may be 1 mm. The material of the tube may be fused silica, for instance. The fibers, whose outer cladding of bulk glass (not shown) has preferably been etched away at least partly, are inserted into the middle bores and pushed through to a waist part 73 of the capillary taper. When the fibers are in place, the capillary tube 70 is heated at the waist section 73 to fuse the fibers to the tube and to form a first central light guiding core 72a and second light guiding cores 71a, which all extend through the optical component 70.

The fibers 71, 72 may as an alternative have an inner core of pure fused silica material and an outer cladding of F-doped silica. In this way, the fused silica glass tube 77 of the optical component 70 may be manufactured from pure fused silica, because the light-guiding cores of the fibers are inherently surrounded by material with a lower refraction index. This means that the light remains in the cores 71a, 72a even if the refraction index of the capillary tube is the same as in the fiber cores. In this case, the outer fiber cladding of bulk glass may be etched away down to the F-doped cladding, or even further, as long as some F-doped cladding remains around the pure or Ge-doped inner fiber core.

The fused cores 71a, 72a (shown with dashed lines) and tube 70 is then cut off or cleaved to create an end surface 74. A dual core fiber 35 like the one shown in FIG. 4 may then be welded to the capillary tube at the end 74, resulting in a seam 75.

In preferred embodiments, the center of the first optical feed fiber 72 is aligned with the center of the component 70, and the centers of, for example, four second optical feed fibers 71 are located to provide an output beam at the output end 74 at a predefined distance R from the first central light guiding core 72a. It is to be appreciated that the number of second feed fibers is not as such limited, but instead 8, 16 or 32 instead of 4, for example. The second light guiding cores 71a are preferably arranged symmetrically with respect to the central core 72a, to provide output beams with an angular distance of 90° between each other.

The presently disclosed laser cutting method and apparatus may be applied in a large variety of applications. Particular advantages are achieved in applications where there is need to achieve excellent cutting surface quality for laser-cutting materials with differing properties, such as thicknesses, and/or changing and multiform cutting operations. A single cutting apparatus may now be used for these varying properties/requirements, enabling to instantly adapt to optimal cutting beam profile accordingly. As some examples, the present system can be particularly advantageous for cutting needs of automobile industry.

It is to be understood that the embodiments of the invention disclosed are not limited to the particular structures, process steps or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

Various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the description numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. A laser processing apparatus comprising:
   at least one first laser device, each first laser device including at least one first optical feed fiber for delivering a first laser beam;
   at least one second laser device, each second laser device including at least one second optical feed fiber for delivering a second laser beam;
   a beam combiner connected to said first and second optical feed fibers and to a multi-core optical fiber, said multi-core optical fiber having a first core with a circular cross-section located in the center of the multi-core optical fiber and a second core with an annular cross-section spaced from and concentric to the first core, wherein said at least one first optical feed fiber is aligned with the first core of said multi-core optical fiber, and wherein said at least one second optical feed fiber is aligned between the inner and outer diameters of said annular second core of said multi-core optical fiber,
   said first and second cores being connectable to a laser processing head, to direct a composite laser beam comprising a first output laser beam and a second, independent output laser beam to a workpiece to be cut wherein the first output laser beam has a circular cross-section and the second output laser beam has an annular cross-section concentric to and spaced from the first output laser beam at the workpiece; and
   a control unit functionally connected to said first and second laser devices, to individually control the power levels of the first and second laser devices to control the power density in said first and second output laser beams in accordance with the speed of the laser processing head relative to the workpiece.

2. The apparatus of claim 1, wherein the apparatus is configured to process the workpiece according to a predetermined processing profile including at least one change of cutting operation progression direction, and wherein the control unit is configured to adjust the power density of at least one of said first and second output laser beams based on the current cutting position in relation to the processing profile.

3. The apparatus of claim 2, wherein the control unit is configured to reduce the power density of said first output laser beam in response to approaching the change point.

4. The apparatus of claim 2, wherein the control unit is configured to reduce the power density of the first output laser beam gradually when approaching the change point.

5. The apparatus of claim 2, wherein the control unit is configured to switch off said first output laser beam in response to the laser processing head approaching the change point and switch on said first output laser beam after the change point.

6. The apparatus of claim 2, wherein the control unit is configured to change modulation of at least one of the first and second output laser beams in response to at least one of: approaching the change point and a change in the thickness of the workpiece.

7. The apparatus of claim 1, wherein the control unit is configured to apply a higher proportion of the power density of said first output laser beam to the power density of said second output laser beam for a first workpiece than for a second workpiece, the first workpiece thickness being less than the second workpiece thickness.

8. The apparatus of claim 1, wherein the control unit is configured to cause piercing of the workpiece by both said first output laser beam and said second output laser beam.

9. The apparatus of claim 1, wherein the control unit is configured to switch off said second output laser beam in response to the thickness of the workpiece falling under a predetermined thickness limit value.

10. The apparatus of claim 1, wherein the control unit is configured to change at least one of: pulse width and frequency of light pulses of at least one of the first laser device and second laser device to control the power density of at least one of the first and second output laser beams.

11. The apparatus of claim 1, wherein the control unit is configured to control the relation of the power densities of either or both the first output laser beam and second output laser beam at least partly on the basis of user input regarding the workpiece.

12. The apparatus of claim 1, wherein a sensor for sensing the thickness of the workpiece is connected to the control unit, and the control unit is configured to adjust the relation of the power densities of the first and second output laser beams on the basis of received sensor output indicating a thickness of the workpiece.

13. The apparatus according to claim 1, wherein said at least one first laser device is a fiber laser.

14. A method for cutting a workpiece with a laser beam, comprising:
generating at least one first laser beam in at least one first laser device and delivering the at least one first laser beam through at least one first optical feed fiber;
generating at least one second laser beam in at least one second laser device and delivering the at least one second laser beam through at least one second optical feed fiber;
combining said first and second laser beams in a multi-core optical fiber, the multi-core optical fiber having a first core with a circular cross-section located in the center of the multi-core optical fiber and a second core with an annular cross-section spaced from and concentric to the first core, by aligning said at least one first optical feed fiber with the first core of said multi-core optical fiber and aligning said at least one second optical feed fiber between the inner and outer diameters of said second core of said multi-core optical fiber;
directing a composite laser beam comprising a first output laser beam and an independent second output laser beam from said multi-core optical fiber to a workpiece to be cut, wherein the first output laser beam has a circular cross-section and the second output laser beam has an annular cross-section concentric to and spaced from the first output laser beam at the workpiece; and
controlling, by a control unit, the power levels of the first and second laser devices to control the power density individually in said first and second output laser beams, wherein the power density of at least one of the first and second output laser beams is controlled in accordance with the speed of the laser processing head relative to the workpiece.

15. The method of claim 14, wherein the workpiece is processed according to a predetermined processing profile including at least one change of cutting operation progression direction, and the power density of at least one of said first and second output laser beams is adjusted based on the current cutting position in relation to the processing profile.

16. The method of claim 15, wherein the power density of said second first output laser beam is reduced in response to approaching the change point.

17. The method of claim 15, wherein the power density of the first output laser beam is reduced gradually when approaching the change point.

18. The method of claim 15, wherein said first output laser beam is switched off in response to approaching the change point and said first output laser beam is switched on after the change point.

19. The method of claim 15, wherein modulation of at least one of the first and second output laser beams is changed in response to approaching the change point and/or in response to a change in the thickness of the workpiece.

20. The method of claim 14, wherein said second output laser beam is switched off in response to the thickness of the workpiece falling under a predetermined thickness limit value.

21. The method of claim 14, wherein pulse width and/or frequency of light pulses of at least one of the first laser device and second laser device is changed to adjust the power density of at least one of the first and second output laser beams.

* * * * *